United States Patent
Wiklem et al.

(10) Patent No.: US 10,543,422 B1
(45) Date of Patent: Jan. 28, 2020

(54) PROVIDING SYNCHRONIZED AND INTEGRATED VIDEO GAMING

(71) Applicant: CP Studios LLC, Salt Lake City, UT (US)

(72) Inventors: Brian Joseph Wiklem, Salt Lake City, UT (US); Carrie Ann Cowan, Salt Lake City, UT (US)

(73) Assignee: CP Studios Inc., Salt Lake City ( * ) Notice: Subject to any disclaimer, the term of this patent is extended or adjusted under 35 U.S.C. 154(b) by 246 days.

(21) Appl. No.: 13/889,274

(22) Filed: May 7, 2013

Related U.S. Application Data

(60) Provisional application No. 61/643,352, filed on May 7, 2012.

(51) Int. Cl.
*A63F 13/00* (2014.01)
*A63F 13/30* (2014.01)

(52) U.S. Cl.
CPC .................. *A63F 13/12* (2013.01)

(58) Field of Classification Search
CPC ................ G07F 17/3225; A63F 2300/407
USPC ........................... 463/17; 707/614
See application file for complete search history.

(56) References Cited

U.S. PATENT DOCUMENTS

| | | | | |
|---|---|---|---|---|
| 5,358,259 A * | 10/1994 | Best | ............ | A63F 13/005 463/31 |
| 6,386,980 B1 * | 5/2002 | Nishino | ............ | A63F 13/10 463/43 |
| 6,478,679 B1 * | 11/2002 | Himoto | ............ | A63F 13/12 463/36 |
| 6,699,125 B2 | 3/2004 | Kirmse et al. | | |
| 7,445,549 B1 * | 11/2008 | Best | ............ | A63F 13/10 463/30 |
| 7,628,688 B2 | 12/2009 | Hinami | | |
| 7,955,175 B1 | 6/2011 | Holloway et al. | | |
| 8,200,020 B1 | 6/2012 | Geiss et al. | | |
| 8,287,341 B1 | 10/2012 | Reynolds et al. | | |
| 8,366,546 B1 | 2/2013 | Naik et al. | | |
| 2002/0111216 A1 * | 8/2002 | Himoto | ............ | A63F 13/12 463/43 |

(Continued)

OTHER PUBLICATIONS

Clash of Clans Strategy Guide—Tapscape www.tapscape.com/clash-of-clans-strategy-guide/, downloaded Apr. 13, 2016 (9 pages).

(Continued)

*Primary Examiner* — David L Lewis
*Assistant Examiner* — Eric M Thomas
(74) *Attorney, Agent, or Firm* — Patent Law Works LLP

(57) ABSTRACT

The synchronized and integrated architecture and method disclosed here provides a continuous visual experience for different players across different platforms and engages them at different levels as they access a particular game within a virtual gaming arena from the different platforms. Each of the players may have a unique and different visual experience, depending upon the gaming platform a player uses. The architecture facilitates access to video gaming applications via personal computers, via mobile devices, via game consoles, via tablets or the like. In some instances, a single player can play a particular game including a main component and a sub-component from the different platforms, where play in the sub-component is seamlessly integrated into the main component.

20 Claims, 10 Drawing Sheets

(56) References Cited

U.S. PATENT DOCUMENTS

| | | | |
|---|---|---|---|
| 2003/0008710 A1* | 1/2003 | Yamaoka | A63F 13/335 463/41 |
| 2003/0038805 A1 | 2/2003 | Wong et al. | |
| 2003/0220143 A1 | 11/2003 | Shteyn et al. | |
| 2004/0266529 A1* | 12/2004 | Chatani | A63F 13/12 463/40 |
| 2005/0049022 A1* | 3/2005 | Mullen | A63F 13/12 463/1 |
| 2007/0087797 A1 | 4/2007 | Van Luchene | |
| 2008/0004117 A1 | 1/2008 | Stamper et al. | |
| 2009/0307226 A1 | 12/2009 | Koster et al. | |
| 2010/0062840 A1 | 3/2010 | Herrmann | |
| 2010/0160038 A1 | 6/2010 | Youm et al. | |
| 2010/0197380 A1 | 8/2010 | Shackleton | |
| 2010/0216553 A1 | 8/2010 | Chudley et al. | |
| 2010/0228614 A1 | 9/2010 | Zhang et al. | |
| 2011/0018868 A1 | 1/2011 | Inoue et al. | |
| 2011/0034246 A1 | 2/2011 | Amitzur | |
| 2011/0201414 A1 | 8/2011 | Barclay et al. | |
| 2011/0320401 A1* | 12/2011 | Mahajan et al. | 707/614 |
| 2012/0072855 A1 | 3/2012 | Baldwin et al. | |
| 2012/0184363 A1 | 7/2012 | Barclay et al. | |
| 2012/0220377 A1 | 8/2012 | Cantor | |
| 2012/0254764 A1 | 10/2012 | Ayloo et al. | |
| 2013/0006709 A1 | 1/2013 | Kosta | |
| 2013/0035164 A1 | 2/2013 | Osvald et al. | |
| 2013/0097517 A1* | 4/2013 | Reiss et al. | 715/741 |
| 2013/0103447 A1 | 4/2013 | Melander et al. | |
| 2013/0141325 A1* | 6/2013 | Bailey | G06F 3/017 345/156 |
| 2013/0184064 A1 | 7/2013 | Manning et al. | |
| 2013/0196732 A1* | 8/2013 | Oochi et al. | 463/17 |
| 2013/0326563 A1* | 12/2013 | Mulcahy | G06F 3/041 725/61 |
| 2014/0004951 A1 | 1/2014 | Kern et al. | |
| 2014/0038721 A1* | 2/2014 | Archer | A63F 13/12 463/42 |

OTHER PUBLICATIONS http://forum.supercell.net, downloaded Apr. 13, 2016 (1 page).
Madden NFL Cooperative Multiplayer Impressions: Ready on Three, Teamwork!, retrieved from http://kotaku.com/5567763/madden-nfl-11-cooperative-multiplayer-impressions-ready-on-three-teamwork on Oct. 10, 2016 (5 pages).

* cited by examiner

PROVIDING SYNCHRONIZED AND INTEGRATED VIDEO GAMING

CROSS REFERENCE TO RELATED APPLICATIONS

The present application claims the benefit of priority under 35 U.S.C. § 119(e) from U.S. Provisional Application No. 61/643,352 entitled "MULTILAYER FRAMEWORK ARCHITECTURE AND USER INTERFACES FOR VIDEO GAMING APPLICATIONS," filed on May 7, 2012, by Brian Joseph Wiklem, Christopher Robert Masterton, and Carrie Ann Cowan. The entire contents of the provisional application are incorporated by reference herein. The present application also incorporates by reference the contents of utility applications entitled "MULTILAYER SYSTEM FRAMEWORK AND ARCHITECTURE WITH VARIABLE GAMING CAPABILITIES," "PROVIDING VIDEO GAMING ACTION VIA COMMUNICATIONS IN A SOCIAL NETWORK," AND "VIDEO GAMING PLATFORM AND USER INTERFACE," all of which are concurrently submitted and claim priority from U.S. Provisional Application No. 61/643,352.

BACKGROUND

The present disclosure relates to video gaming applications and platforms, including those hosted on websites, dedicated either wholly or partially to them, and accessed by players either directly or via online services or communities, for example, social networks. In particular, the present disclosure relates to providing synchronized and integrated video gaming.

In recent years, video games have become extremely popular. Video games are used not only for entertainment, but also for instructional purposes. Players typically interact with a gaming application through computers or console peripherals such as a keyboard, a mouse, joysticks, a wide variety of game pads, and funny controllers such as the NES Zapper®. More recently, nontraditional controller technologies such as dance pads, the Wii-mote® or the Kinect®, offering new types of gaming experiences are beginning to emerge. These technologies are capable of enhancing games to incorporate movement, thereby creating a new experience and attracting new audiences.

With the popularity of social networks reaching epic proportions, social games have also become very popular.

With the ongoing trends and exponential growth in video gaming, it would certainly be beneficial to find better architectures for gaming applications that continue to enhance the user experience.

SUMMARY

The present disclosure overcomes the deficiencies and limitations of the prior art by providing a technology with a synchronized and integrated architecture for video gaming applications. In some embodiments, the synchronized and integrated architecture provides a continuous visual experience for players across different platforms (platform agnostic) and engages them at different levels as they access a particular game from the different platforms. In some instances, each of the players may have a unique and different visual experience, depending upon the gaming platform a player uses. The architecture facilitates access to video gaming applications via personal computers, via mobile devices, via game consoles, via tablets or the like. In some instances, a single player can play a particular game including a main component and a sub-component from the different platforms, where play in the sub-component is seamlessly integrated into the main component.

In some implementations, the architecture facilitates access to video gaming applications in various ways, including 1) via social networks or sites, for example, accessed via personal computers; 2) via wall posts or via an online social networking service that enables its users to communicate by sending and reading text-based posts; 3) via mobile devices (iOS®, Android™, or Windows-based smart phones); and 4) via game consoles (for example, PS3®, Xbox 360®, or Wii®).

Video gaming applications may be purchased via platform application stores or otherwise. These applications are supported by Android™ (Android™ is a Linux-based operating system for mobile devices such as smartphones and tablet computers—it is developed by the Open Handset Alliance), iOS® (a mobile operating system developed by Apple Inc.) platforms, and phones operating windows. The user interface of an iOS® platform is based on the concept of direct manipulation, using multi-touch gestures. Interface control elements consist of sliders, switches, and buttons. The response to user input is immediate and provides a fluid interface.

Video gaming applications may be hosted or accessed via social networks, other third party services or on third party servers, stand-alone platforms, tablets, smartphones or the like. Multiple players (hundreds, thousands, if not millions) may access gaming application via any or all of these ways. In addition, the synchronized and integrated architecture provides a scalable infrastructure with cross-platform pollination technology (game plays including achievements and rewards are transferred between platforms used by particular players) and secure collection of data. Video gaming applications may be based on universal themes that appeal to a broad range of demographics and provides a continuous flow of data analytics. They offer opportunities for configuring advertisements and promotions to accomplish strategic goals.

In some embodiments, the synchronized and integrated architecture provides multiple levels of play, permitting players to engage in different ways from different platforms or a single player to engage from multiple platforms. The different levels of play options include 1) a peer-to-peer competitive challenge level for core players, 2) a casual play option for play with friends with whom a player shares an affinity, for example, in a social network; and a 3) spectator mode that permits non-players in a network to assist friends. Feed-based triggers allow for greater rewards to players and ease of discovering games.

In yet other embodiments, which may include any or all of the aspects described above, the synchronized and integrated architecture permits mobile play, extending the gaming arena or world to different platforms, so achievements in a particular game may be earned and shared more easily across platforms. In addition, a player may earn location-based rewards.

Moreover, the synchronized and integrated architecture provides a system of rewards at check-in, to coax players by providing greater incentives. The synchronized and integrated architecture permits concurrent "solo" play by a player or gamer, collaborative and competitive play by multiple players. The synchronized and integrated architecture has user interfaces that are configured to provide different experiences for different players, including for example, a three-dimensional user experience. In some embodiments, the video gaming applications include story-driven quests and game play, giving players more than just tasks and chores. As one example, an aviation gaming application may utilize a collection of 250 or more aircrafts and include transactions relating to the aircrafts and their environment, creation of the environment in which the aircrafts operate etc. In this particular application, players may create and manage their experience (for example, build and manage an aviation empire) from various different platforms, enjoy the thrill of history (aviation's past), and travel the globe and fly through an open network of friendly and rival airports.

In yet other embodiments, the system provides a plurality of features for player control of the virtual arena including control of "play" times, "gifts" and "rewards," "collect" and "decorate" features, monitor types of "play" (for example, acceleration progress), generate user content, etc.

In some embodiments, the video gaming applications may be free, when accessed via social-network platforms or otherwise, in which instances revenue is generated via market place for products used during the game, direct advertising etc. The synchronized and integrated architecture permits for easy access through a particular player's social network, allowing other players to discover a particular game and permit conversion as necessary.

In yet other embodiments, linking or connecting platforms creates a more interesting gaming world.

BRIEF DESCRIPTION OF THE DRAWINGS

The present disclosure is illustrated by way of example, and not by way of limitation, in the figures of the accompanying drawings, in which like reference numerals are used to refer to similar elements.

DETAILED DESCRIPTION

Figure 1:
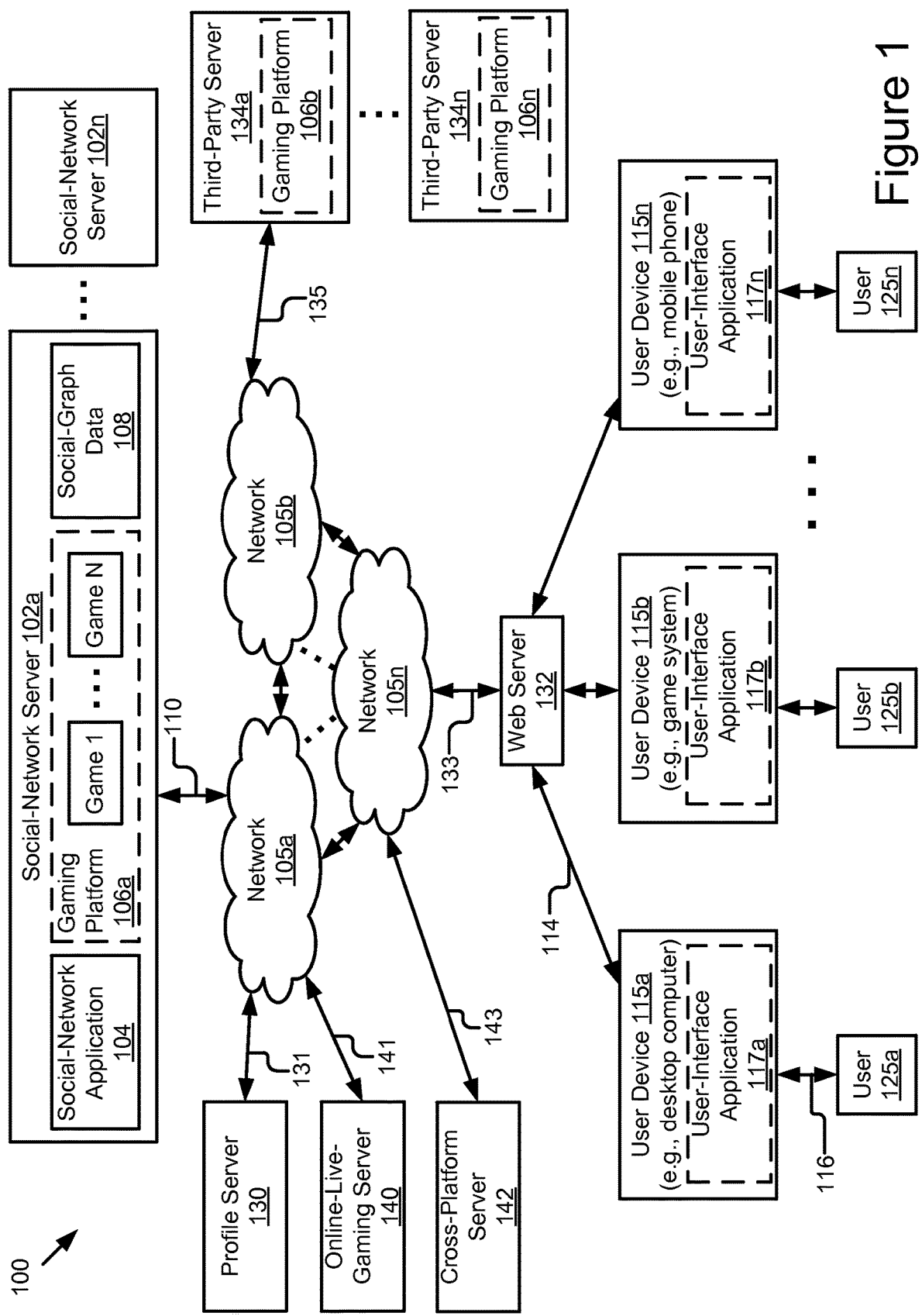
FIG. 1 is a high-level block diagram illustrating an example system architecture for providing synchronized and integrated video gaming.

The present technology is directed to synchronized and integrated architecture for facilitating video gaming among users (e.g., players or gamers, clients), which are hosted either in social networks, third party servers, or otherwise in a cloud or coordinated web sites etc. The specification describes examples of systems and methods for providing this synchronized and integrated architecture to facilitate a unique user experience.

In some embodiments, the synchronized and integrated architecture provides a continuous visual experience for players across different platforms (platform agnostic) and engages them at different levels. Each of the players may have a unique and different visual experience, depending upon the gaming platform a player uses. This synchronized and integrated architecture facilitates access to video gaming arenas or applications in various ways, including 1) via social networks or sites, for example, accessed via personal computers (desk tops or lap tops); 2) via wall posts or via an online social networking service that enables its users to send and read text-based posts; 3) via mobile devices (iOS®, Android™, or Windows-based smart phones); and 4) via game consoles (for example, PS3®, Xbox 360®, or Wii®).

Video gaming applications may be purchased via platform application stores or otherwise. These applications are supported by Android™ (Android™ is a Linux-based operating system for mobile devices such as smartphones and tablet computers—it is developed by the Open Handset Alliance), iOS® (a mobile operating system developed by Apple Inc.) platforms, and phone operating windows. The user interface of iOS® is based on the concept of direct manipulation, using multi-touch gestures. Interface control elements consist of sliders, switches, and buttons. The response to user input is immediate and provides a fluid interface.

Video gaming applications may be hosted or accessed via social networks, other third party services or on third party servers (configured individually or in a cloud formation), stand-alone platforms, tablets, smartphones, or the like. Multiple players (hundreds, thousands, if not millions) may access gaming one or more applications via any or all of these ways. In addition, the synchronized and integrated architecture provides a scalable infrastructure with cross-platform pollination technology (game plays including achievements and rewards are transferred between platforms for particular players) and secure data collection. Video gaming applications may be based on universal themes that appeal to a broad range of demographics and provides a continuous flow of data analytics. They offer opportunities for configuring advertisements and promotions to accomplish strategic goals.

In yet other embodiments, which may include any or all of the aspects described above, the synchronized and integrated architecture permits mobile play, extending the gaming arena or world to different platforms (used by different players as well as the same player), so achievements in a particular game may be earned and shared more easily across platforms. In addition, a player may earn location-based rewards.

Moreover, the system provides rewards at check-in, to coax players by providing greater incentives. The synchronized and integrated architecture permits for concurrent "solo" play by a player or gamer and collaborative and competitive play between multiple players. User interfaces are configured to provide different experiences for different players, including a three-dimensional user experience. In some embodiments, the video gaming applications include story-driven quests and game play, giving players more than just tasks and chores. As one example, an aviation gaming application, may utilize a collection of 250 aircrafts and include transactions relating to the aircrafts and its environment, permitting players to create an environment in which the aircrafts operate etc. In this particular application, players may create and manage their experience (for example, by creating an aviation empire), enjoy the thrill of history (aviation's past), and travel the globe and fly through an open network of friendly and rival airports.

The system provides features for player control of the virtual arena including control of "play" times, "gifts" and "rewards," "collect" and "decorate," monitor "play" (for example, acceleration progress), generate user content, etc.

Players (with any status described above) may access game play via mobile devices or other platforms, at any location, and receive location-based rewards. They may access a virtual game arena, their own or that of other players, via several platforms and take up play where they left off. They may link up friends for collaborative play. Players may also participate in stand-alone game play, via tablets, mobile devices, console-based gameplay, target-based game play or the like. In addition, the system permits cross-pollination game play, sending game objects from one game world or arena to another.

In the following description, for purposes of explanation, numerous specific details are indicated in order to provide a thorough understanding of the technology described. It should be apparent, however, to one skilled in the art, that this technology can be practiced without these specific details. In other instances, structures and devices are shown in block diagram form in order to avoid obscuring the technology. For example, the present technology is described with some embodiments below with reference to particular user interfaces or user platforms and particular hardware. However, the present technology applies to any type of computing device or platform that can receive data and commands, and any devices providing services. Moreover, the present technology is described below primarily in the context of video gaming applications configured to enhance and improve the quality of these gaming applications in order to facilitate synchronous play by hundreds, thousands, if not millions of players. The players may enjoy different user experiences based on their individual preferences and may enjoy seamless play across different gaming platforms or devices (desktop computer, mobile device or the like). However, those skilled in the art should understand that the present technology applies to any type of application and can be used for other applications beyond gaming applications.

Reference in the specification to "one embodiment," "an embodiment," or "some embodiments" means simply that one or more particular features, structures, or characteristics described in connection with the one or more embodiments is included in at least one or more embodiments that are described. The appearances of the phrase "in one embodiment" in various places in the specification are not necessarily all referring to the same embodiment.

Some portions of the detailed descriptions that follow may be presented in terms of algorithms and symbolic representations of operations on data bits within a computer memory of either one or more computing devices or gaming platforms. These algorithmic descriptions and representations are the means used by those skilled in the data processing arts to most effectively convey the substance of their work to others skilled in the art. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the following discussion, it should be appreciated that throughout the description, discussions utilizing terms such as "processing," "computing," "calculating," "determining," or "displaying" or the like, refer to the action and processes of a computer system, or similar electronic computing device or platform, that manipulates and transforms data represented as physical (electronic) quantities within the computer system's registers and memories into other data similarly represented as physical quantities within the computer system memories or registers or other such information storage, transmission, or display devices.

The present technology also relates to an apparatus or one or more synchronized and integrated systems for performing the operations described here. This apparatus or one or more systems may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

This technology can take the form of an entirely hardware embodiment, an entirely software embodiment, or an embodiment containing both hardware and software components. In some embodiments, this technology is implemented in software, which includes but is not limited to firmware, resident software, microcode, etc.

Furthermore, this technology can take the form of a computer program product accessible from a computer-usable or computer-readable medium providing program code for use by or in connection with a computer or any instruction execution system. For the purposes of this description, a computer-usable or computer-readable medium may be any apparatus that can contain, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements may include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Communication units including network adapters may also be coupled to the systems to enable them to couple to other data processing systems, remote printers, or storage devices, through either intervening private or public networks. Modems, cable modems, and Ethernet cards are just a few examples of the currently available types of network adapters.

Finally, the algorithms and displays presented in this application are not inherently related to any particular computer, gaming platform or other apparatus. Various general-purpose systems may be used with programs in accordance with the teachings here, or it may prove convenient to construct more specialized apparatus to perform the required method steps. The required structure for a variety of these systems is outlined in the description below. In addition, the present technology is not described with reference to any particular programming language. It should be understood that a variety of programming languages may be used to implement the technology as described here.

System Architecture Overview

FIG. 1 is a high-level block diagram illustrating some embodiments of systems for providing synchronized and integrated gaming applications, accessed either via social networks or hosted on third party servers. The system 100 illustrated in FIG. 1 provides one or more gaming platforms (one gaming platform 106a illustrated on a social network server 102a), so that participants (players or gamers) may access one or more games (Game 1 . . . Game N), initiate a play on one device or gaming platform (for example, as gaming platform 106a) and continue play at another device or gaming platform (for example, 106b through 106n), making transitions between devices or platforms essentially seamless and enabling a continuous playing experience for one or more players.

The system 100 includes one or more social network servers 102a through 102n that may be accessed via user devices 115a, 115b, through 115n, which are used by one or more users 125a, 125b, through 125n, to connect to any one of the social network servers 102a through 102n or third party servers 134a through 134n. The user devices 115a through 115n may be a desktop computer, a game system, a mobile phone, or other electronic device. These entities (user devices 115a-115n and social network servers 102a-102n) are communicatively coupled via one or more networks 105a, 105b, and 105n. Although only three user devices or platforms 115a, 115b, through 115n are illustrated, any numbers of user devices or platforms 115n may be used by any number of users (players, gamers, or the like) 125n. Moreover, those skilled in the art should recognize that while the present disclosure is described below primarily in the context of providing gaming applications in a synchronized and integrated architecture or setting, the present disclosure may be applicable to other types of applications, for entertainment or otherwise. As one example, gaming applications may include operations for creating plays, participating in plays, etc.

The user devices 115a through 115n in FIG. 1 are illustrated by way of example. Although FIG. 1 illustrates only three devices, the present disclosure applies to any system architecture having one or more user devices 115a through 115n, therefore, any number of user devices 115n (hundreds, thousands, even millions or more) may be used.

Furthermore, while only three networks 105a, 105b, and 105n are illustrated as coupled to the user devices 115a, 115b through 115n, the social network servers 102a-102n, the profile server 130, the web server 132, an online-live-gaming server 140, a cross-platform server, and one or more third party servers 134a through 134n, in practice, any number of networks 105n may be connected, either directly or indirectly, to these entities. In addition, although only two third party servers 134a through 134n are shown, the system architecture 100 may include one or more third party servers 134n, each with a gaming platform 106b through 106n, operating one or more gaming applications that are similar or different.

In some embodiments, the social network server 102a is coupled to the network 105a, via a signal line 110. The social network server 102a includes a social network application 104, which comprises the software routines and instructions to operate the social network server 102a and its functions and operations. Although only one social network server 102a is described here, persons of ordinary skill in the art should recognize that multiple servers may be present, as illustrated by social network servers 102n, each with functionality similar to social network server 102a or different.

The term "social network" as used here encompasses its plain and ordinary meaning including, but not limited to, any type of social structure where the users are connected by a common feature or link. The common feature includes relationships/connections, e.g., friendship, family, work, a similar interest, etc. The common features are provided by one or more social networking systems, such as those included in the system architecture 100, including explicitly-defined relationships and relationships implied by social connections with other online users, where the relationships form a social graph 108.

The term "social graph" as used here encompasses its plain and ordinary meaning including, but not limited to, a set of online relationships between users (players and non-players), such as provided by one or more social networking systems, operating on social network servers 102a through 102n, including explicitly-defined relationships and relationships implied by social connections with other online users, where the relationships form a social graph. In some examples, the social graph 108 may reflect a mapping of these users and how they are related.

It should be understood that social network server 102a and the social network software/application 104 are representative of a single social network. Each of the plurality of social networks 102a through 102n is coupled to any one of the networks 105a, 105b, and 105n, each having its own server, application, and social graph. For example, a first social network system operated or hosted on a social network server may be directed to business networking, a second directed to or centered on academics, a third directed to local business, a fourth directed to dating or gaming, and yet others directed to other general interests or perhaps a specific focus. Yet, each may provide access to a gaming platform 106a for operating or providing access to video gaming applications.

A profile server 130 is illustrated as a stand-alone server in FIG. 1. In other embodiments of the system architecture 100, all or part of the profile server 130 may be part of the social network server 102a. The profile server 130 is directly connected to the network 105a, via a line 131. The profile server 130 stores profiles for all the users that belong to a social network. A third party server 134a is connected to the network 105b, via a signal line 135. A web server 132 is connected, via a line 133, to the network 105n. The web server 132 delivers access to content, via the internet, for example, by hosted websites or the like. Users (for example, players, gamers, or clients) may use the web browsers on their electronic devices or gaming platforms to browse for gaming applications and access websites hosting gaming applications. The online-live-gaming server 140 is connected to the network 105a via a line 141 and is an example of a server hosting live games. The cross-platform server 142 is connected to the network 105n, via a line 143, and is an example of a single platform that may be a front-end interface to other dedicated platforms.

The user devices or player gaming platforms 115a through 115n can be a computing device, for example, a laptop computer, a desktop computer, a tablet computer, a mobile telephone (iOS®, Android™, or windows-based phone, a personal digital assistant (PDA), a mobile email device, a portable game player, a game console (PS3®, Xbox 360®, WHO or the like) a portable music player, a television with one or more processors embedded in the television or coupled to it, or any other electronic device capable of accessing a network and participating in a gaming application.

The network 105a, 105b, or 105n, is of conventional type, wired or wireless, and may have any number of configurations, such as a star configuration, token ring configuration, or other configurations known to those skilled in the art. Furthermore, the network 105 may comprise a local area network (LAN), a wide area network (WAN, e.g., the Internet), and/or any other interconnected data path across which one or more devices may communicate.

In another embodiment, the network 105a, 105b, or 105n may be a peer-to-peer network. The network 105a, 105b, or 105n may also be coupled to or include portions of one or more telecommunications networks for sending data in a variety of different communication protocols.

In yet another embodiment, the network 105a, 105b, or 105n, includes Bluetooth communication networks or a cellular communications network for sending and receiving data such as via short messaging service (SMS), multimedia messaging service (MMS), hypertext transfer protocol (HTTP), direct data connection, WAP, email, etc.

In some embodiments, the social network server 102a, the profile server 130, the web server 132, and the third party servers 134a through 134n are hardware servers including a processor, memory, and network communication capabilities. One or more of the users (players or gamers) 125a through 125n access any of the social network servers 102a through 102n, or the third party servers 134a through 134n, via browsers in their user devices or gaming platforms and via the web server 132. The user devices 115a through 115n have user interface applications 117a, 117b, through 117n, that manage access by particular players to select gaming applications or their choice.

Figure 2:
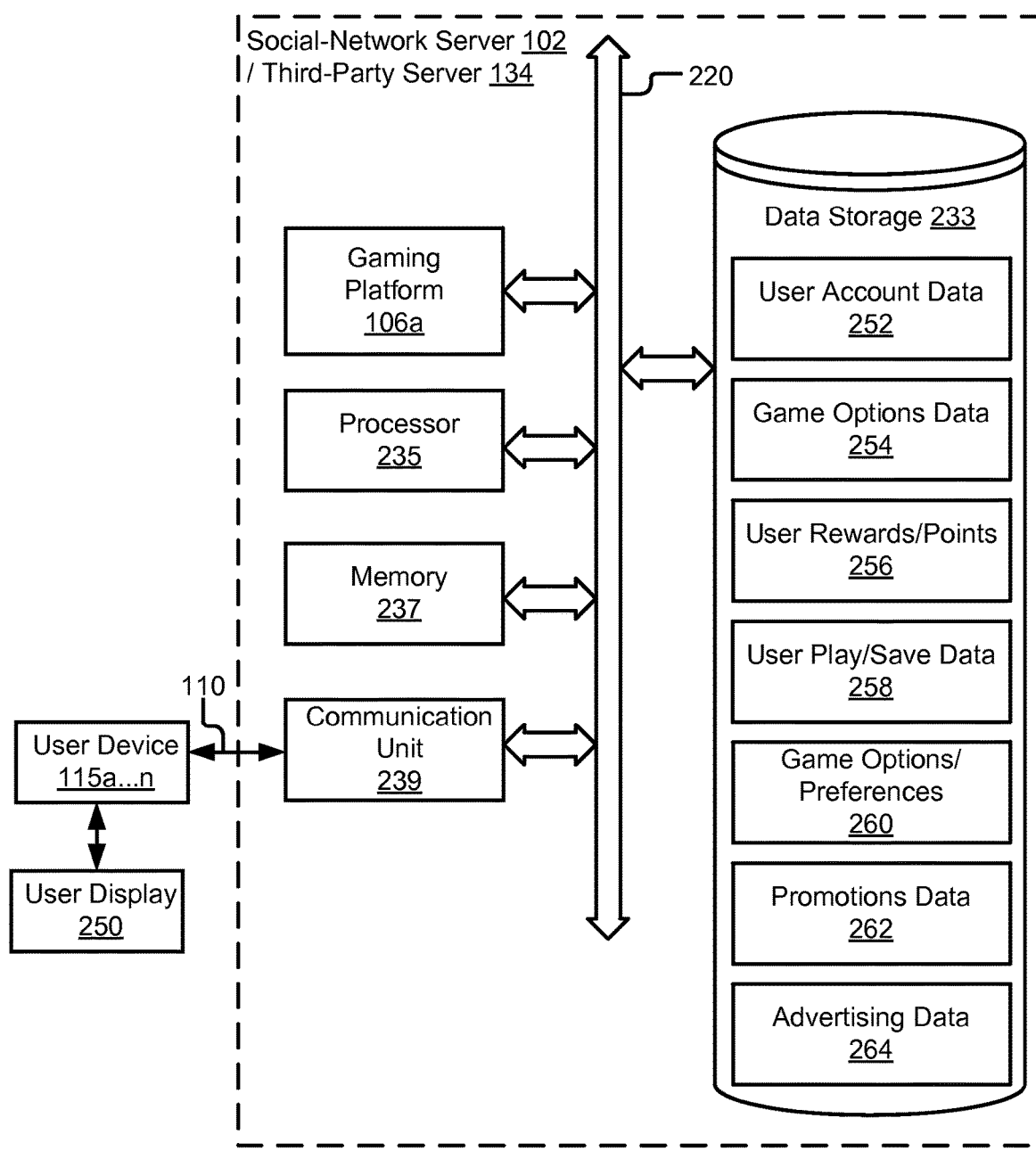
FIG. 2 is a block diagram illustrating an example social network server or a third party server shown in FIG. 1, including its hardware components.

FIG. 2 is a block diagram illustrating some embodiments of the social network server 102 (a through n) or third party server 134 (a through n). It should be recognized that the online-live-gaming server 140 and/or the cross-platform server 142 may be configured with similar hardware components. In FIG. 2, like reference numerals have been used to reference like components with the same or similar functionality that has been described above with reference to FIG. 1. Since those components have been described above that description is not repeated here. The social network server 102 or third-party server 134 generally comprises one or more processors, although only one processor 235 is illustrated in FIG. 2. The processor is coupled via a bus 220 to memory 237 and database storage 233, which stores user account data 252, game options data 254, user rewards/points 256, user play/save data 258, game options/preferences 260, promotion data 262 and advertising data 264.

In some embodiments, the database storage 233 is a database organized by the hosting server and the user, or either one. For each user or player, the data storage 233 stores data on the user and user game plays etc. For example, this data may include game plays and related social network activity such as posts, shares, invitations, status changes etc., associated with each user engaged in a video gaming application.

A user or player 125a, via a user or gaming device 115a, communicates a request to initiate a gaming application or reacts to a keyword via communication unit 239. The "set up" for a video gaming application is managed by the gaming platform 106a or 106b. It should be recognized that the gaming platform 106a (illustrated in the social network server 102a) and 106b (illustrated in the third party server 134a) are shown separately, but include similar functionality, at least for purposes of operating the gaming applications. A user or player display 250 coupled to the user device 115a through n, is configured to provide the video source of the gaming application in one of many formats, high definition graphics, three dimensional formats etc.

Figure 3:
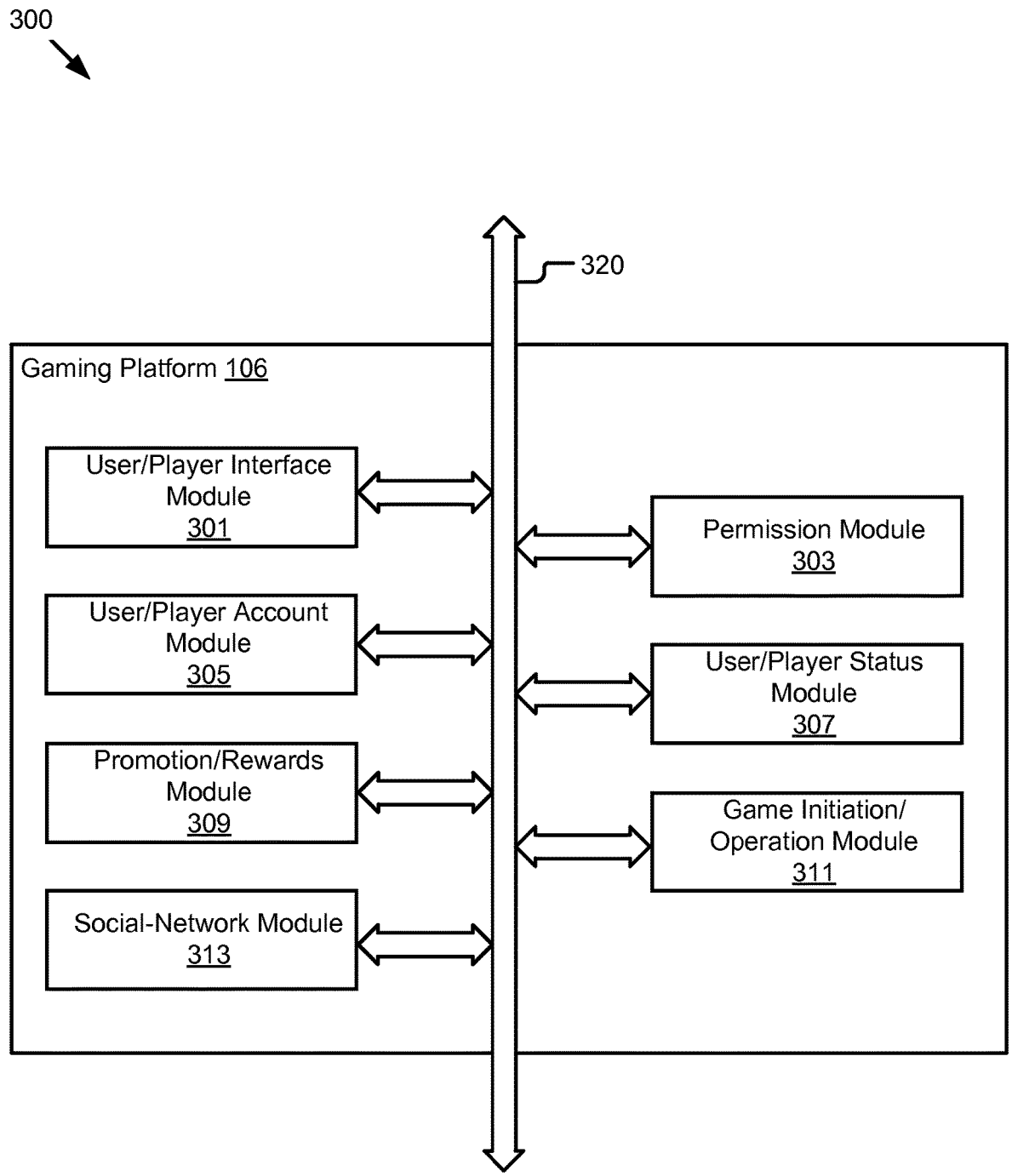
FIG. 3 is a block diagram illustrating an example gaming platform shown in FIGS. 1 and 2, and its software components.

Referring now to FIG. 3, like reference numerals have been used to reference like components with the same or similar functionality that has been described above with reference to FIG. 1. Since those components have been described above, that description is not repeated here. The gaming platform 106 (a orb or other) includes various modules that are programmed to perform the functionalities described here. These modules may be variously distributed or may be in a single unit. The gaming platform 106 (as it may appear in either a social network server, a third-party server, an online-live-gaming server or cross-platform server includes a user interface module 301, a permissions module 303, a user/player account module 305, a user/player status module 307, a promotion module 309, a game initiation/operation module 311, and a social-network module 313. Each of these modules is coupled to a software communication mechanism 320 to communicate with the other modules. Examples of a software communications mechanism 320 may be an object bus (such as COBRA), direct socket communication (such as TCP/IP sockets) among software modules, remote procedure calls, UDP broadcasts and receipts, HTTP connections, function or procedure calls etc. Further, any or all of the communication could be secure (SSH, HTTPS, etc.). The software communication can be implemented on any underlying hardware, such as a network, the Internet, a bus 220 of FIG. 2, or a combination thereof etc.

As one example, a particular user 125a communicates via a user device 115a, to either initiate or react to a game play. The user interface module 301 facilitates a connection of the user device 115a with the social network server 102a/the third-party server 134a or other server, in the event the player wishes to engage or participate in a gaming application via the social network server 102a/third-party server 134a or any other server illustrated in FIG. 1. The permission module 303 ensures that the user device is compliant with protocols and any privacy concerns. Once a video gaming application has been set up, the user/player account module 305 makes a note of the user to determine if the user has an existing account or must create one. The user/player status module 307 considers the status of the various users (for example, "leader," "follower," or "spectator" or any other designation accorded by a particular game). A promotion/rewards module 309 operates the necessary promotions or rewards permitting players to earn rewards accorded by the promotions. The game initiation/operation module 311 initiates "play" and the social network or other server module 313 tracks the applications engaged by a particular player and updates the player's social or game profile accordingly.

Methods

Figure 4:
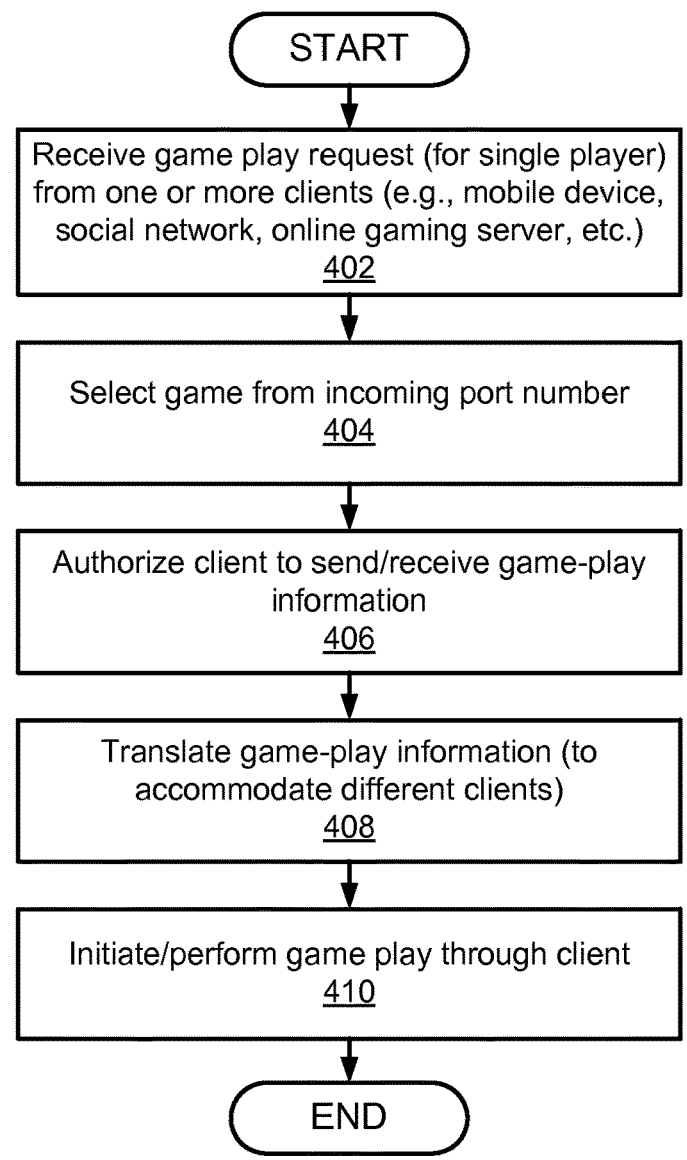
FIG. 4 is a flow chart illustrating an example general method for allowing access from one or more clients (e.g., players or gamers).

Referring now to FIG. 4, an example method 400 illustrates the operations involved with allowing access from one or more clients (users, players, or gamers) to a game. The method 400 begins and proceeds (either directly or via other operations) to a block 402 including one or more operations configured to receive a game play request (for a single player) from one or more clients (for example, via a mobile device, a social network, online gaming server etc.). From there the method 400 proceeds to the next block 404, which includes one or more operations configured to select a game from an incoming port number. From there, the method 400 proceeds to the next block 406, which includes one or more operations configured to authorize a client to send/receive game-play information. From that point the method 400 proceeds to the next block 408, which includes one or more operations for translating game-play information in order to accommodate different clients. From there, the method 400 proceeds to the next block 410 including one or more operations configured to either initiate or perform game play through the client. From there, the method 400 (or subroutine) may either end or proceed to other blocks of operations.

Figure 5:
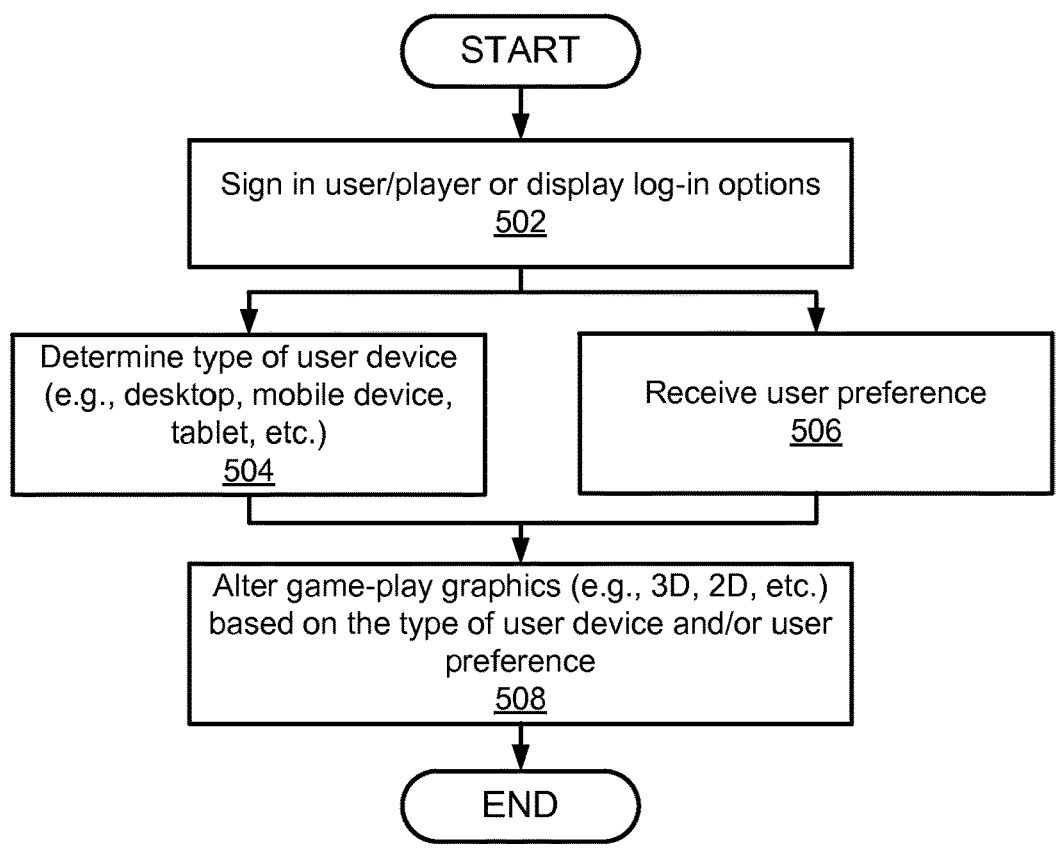
FIG. 5 is a flow chart illustrating an example method for determining graphics based on a user device or platform.

Referring now to FIG. 5, an example method 500 illustrates how to determine game-play graphics based on a user device. The method 500 begins and proceeds to block 502, which includes one or more operations configured to sign in a user/player or display log-in options. The method 500 proceeds to either block 504 or 506. In block 504, the method 500 includes one or more operations for determining the type of user device (for example, desktop, mobile device, tablet etc.) In block 506, the method 500 includes one or more operations for receiving user preferences. From blocks 504 and 506, the method 500 proceeds to block 508, at which stage, with one or more operations, the method alters game-play graphics (for example, 3D, 2D, etc.) based on the type of user device and/or user preference. From there the method 500 (or subroutine) may end or proceed to other subroutines.

Figure 6:
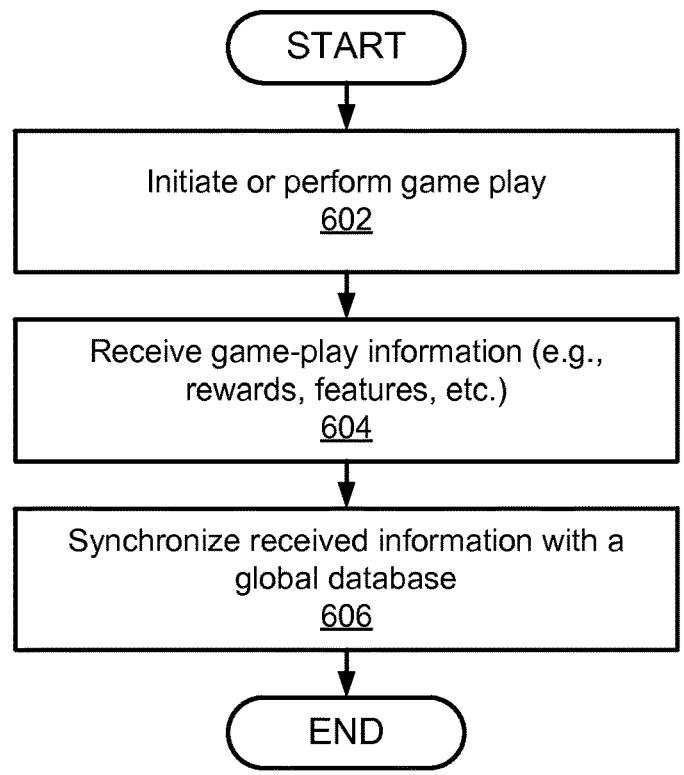
FIG. 6 is a flow chart illustrating an example method for synchronizing information across platforms.

Referring now to FIG. 6, a method 600 for synchronizing information across platforms begins and proceeds (either directly or via other operations) to a block 602, including one or more operations for either initiating or performing game play. From there, the method 600 proceeds to the next block 604, including one or more operations for receiving game-play information (for example, rewards, features, etc.) From there, the method 600 proceeds to the next block 606, which includes one or more operations configured to synchronize information that is received with a global database. From there, the method 600 (a subroutine) may either end or proceed to other operations.

Figure 7:
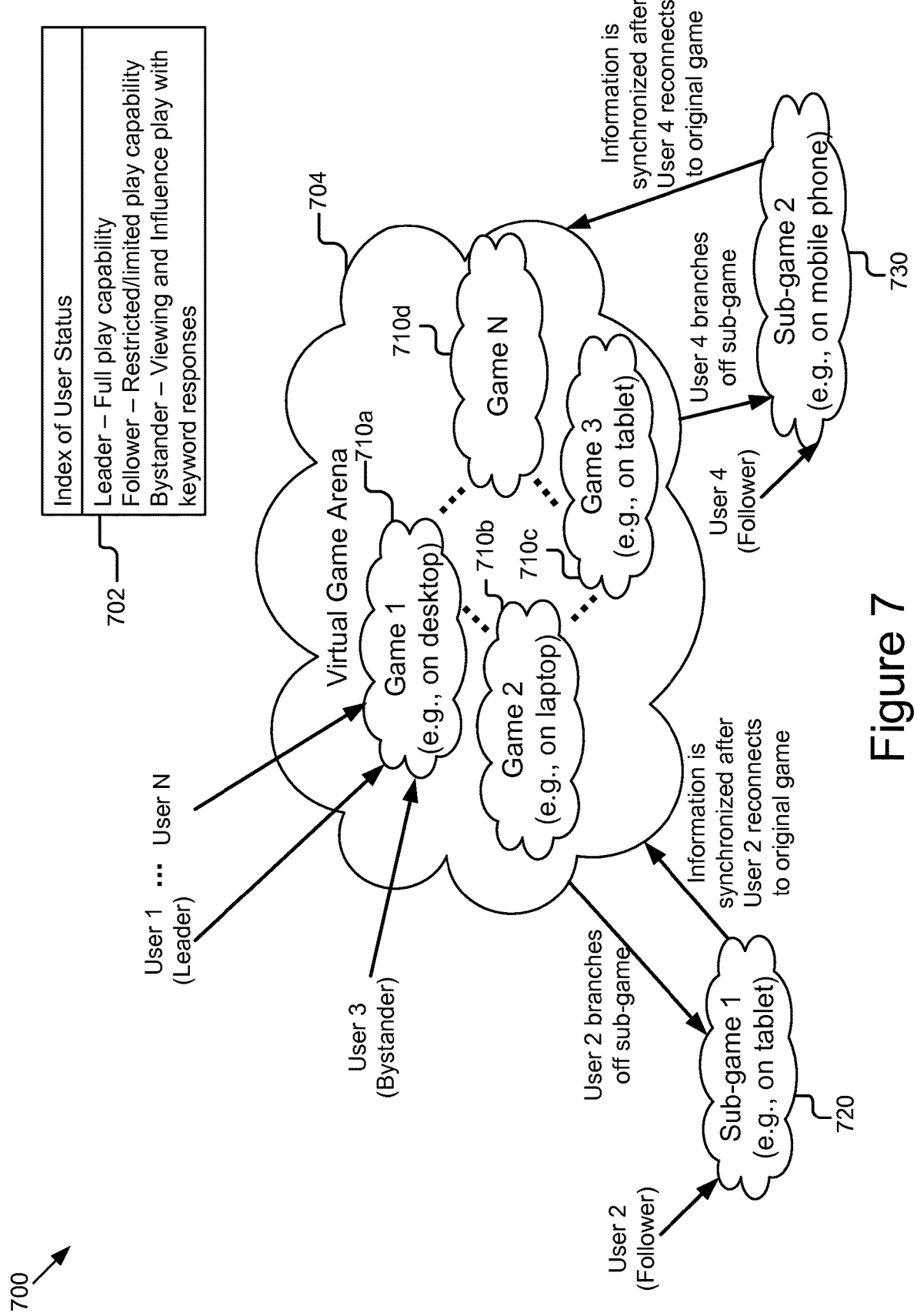
FIG. 7 is a graphical representation of a "virtual" game arena illustrating several games (Game 1 through Game N) at play and reflecting variable user status for each of the users and the platforms used by each user to facilitate synchronized and integrated play.

Referring now to FIG. 7, a graphical representation illustrates generally as indicated by reference numeral 700 integrated play by various users with a different user status. An index of user status is indicated by reference numeral 702 indicating a "leader," a "follower," and a "bystander." The examples of user "status" indicated accords full play capabilities to a "leader," "restricted" or "limited" play capabilities to a "follower" and "viewing" and capability to "influence" play with keyword responses to a "bystander." FIG. 7 illustrates that multiple users, for example, Users 1, 2, 3, through N, each with a different status, for example, either "leader," "bystander," or "follower," may initiate games, for example, Game 1 (indicated by reference numeral 710a), Game 2 (indicated by reference numeral 710b), Game 3 (indicated by reference numeral 710c) through Game N (indicated by reference numeral 710d). Each of these games is played in a virtual game arena 704, either individual or shared, hosted on a dedicated server or in a cloud. Game 1 is displayed or accessed on a desktop, Game 2 on a laptop, Game 3 on a tablet. As one example, User 1 (a "leader") is illustrated as accessing Game 1 on a desktop. As another example, User 3 (a "bystander") is illustrated as viewing Game 1. As yet another example, User 2 (a "follower") is illustrated as branching off to a sub game 1 (indicated by reference numeral 720), for separate play on a tablet. Any information accumulated during the sub game is synchronized after User 2 reconnects to the original game. A user with "bystander" status (User 3) may influence the game by responding to wall posts or responding with a key word. Reward or point allocation is based on the status of the player. For example, a player playing a game (for example, a follower), receives rewards or takes away from the main game player more than a bystander does. A bystander does not receive any rewards; its role is simply to assist a friend or influence game play by a "core" player. As another example, User 4 (for example, a follower) may branch off to a sub-game on a mobile phone. Any information for or on the game is synchronized after User 4 reconnects to the original game.

Figure 8:
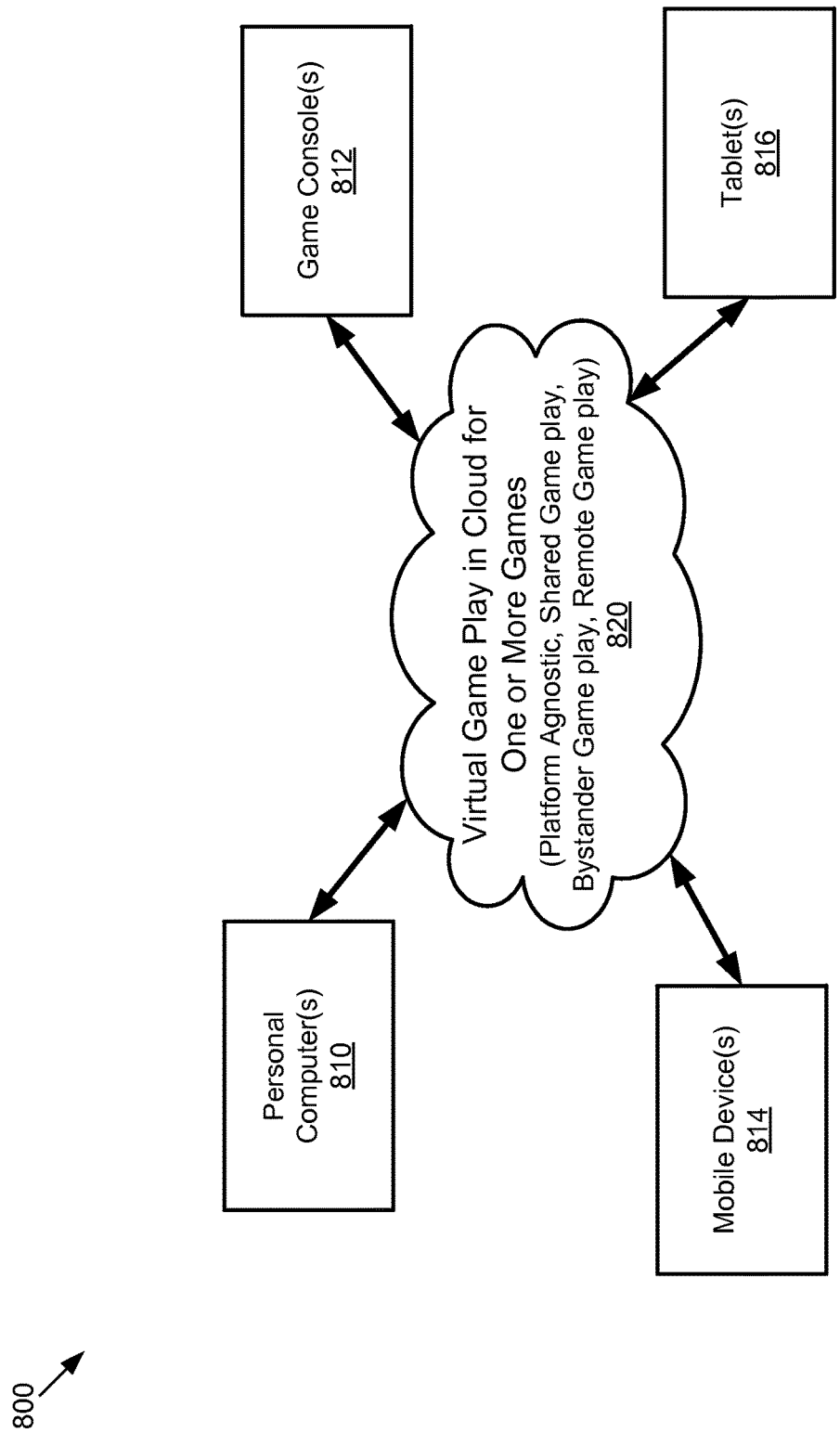
FIG. 8 is a graphical representation/block diagram of example virtual game play in a cloud of one or more games, each accessed via different platforms.

Referring now to FIG. 8, a graphical representation illustrates that virtual game play may be operated in a cloud for one or more games, concurrently or otherwise, as indicated by reference numeral 820. The platform may be agnostic facilitating shared game play, bystander game play or remote game play. Players or gamers may access this virtual game play either via a personal computer 810, a game console 812, a mobile device 814, or a tablet 816.

Figure 9:
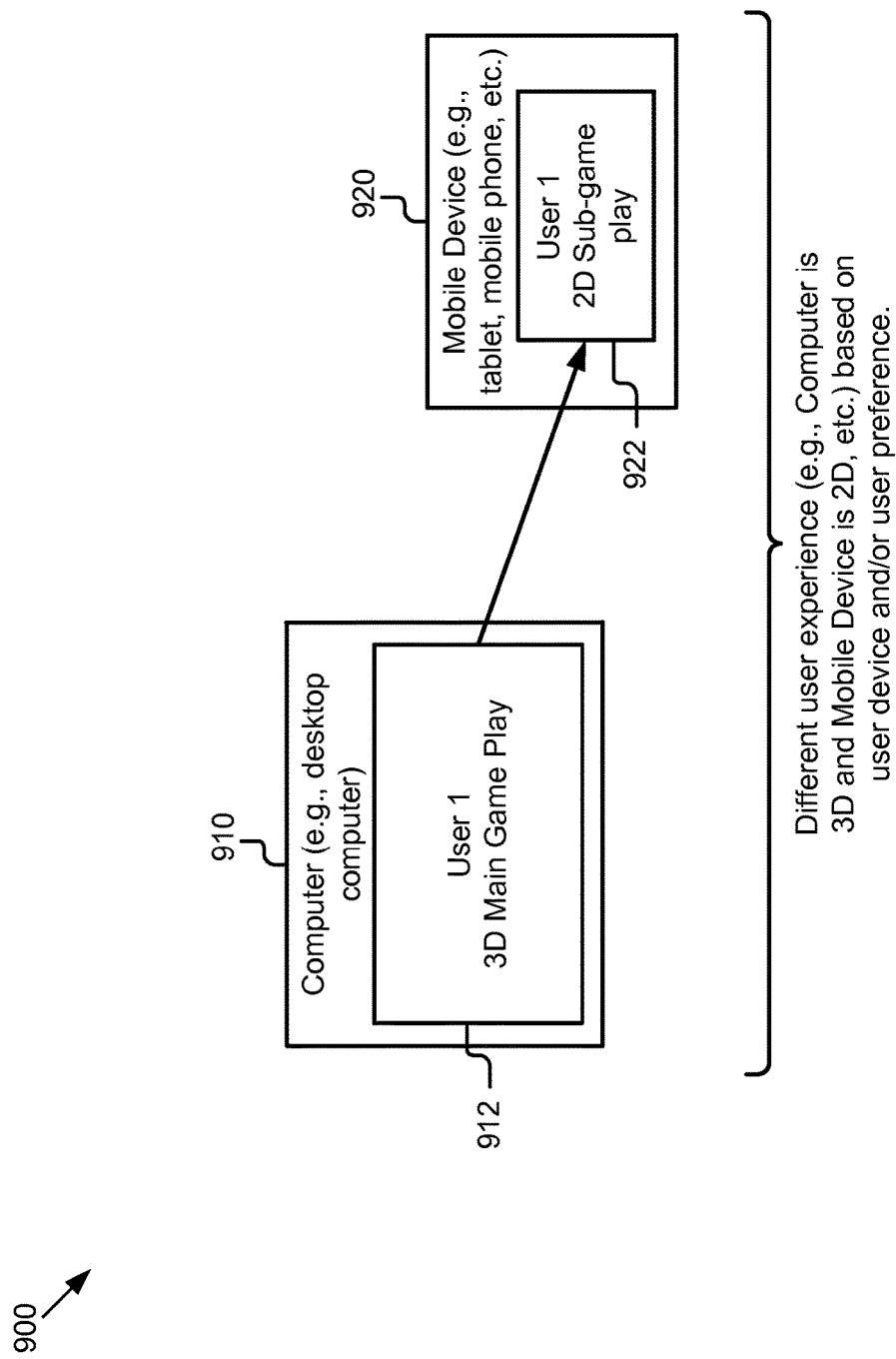
FIG. 9 is a graphical representation illustrating an example of a different user experience based on a user device and/or user preference.

FIG. 9 illustrates a graphical representation indicated generally by reference numeral 900 to show different user experience. For example, a particular user (User 1) may experience a three-dimensional (3D) display on a computer 910 (for example, a desktop) during the main game 912. From the main game, the same user (User 1) may branch off to a sub-game play to experience a two-dimensional display (2D) as indicated by reference numeral 922 on a mobile device 920 (for example, on either a tablet, a mobile device, etc.).

Figure 10:
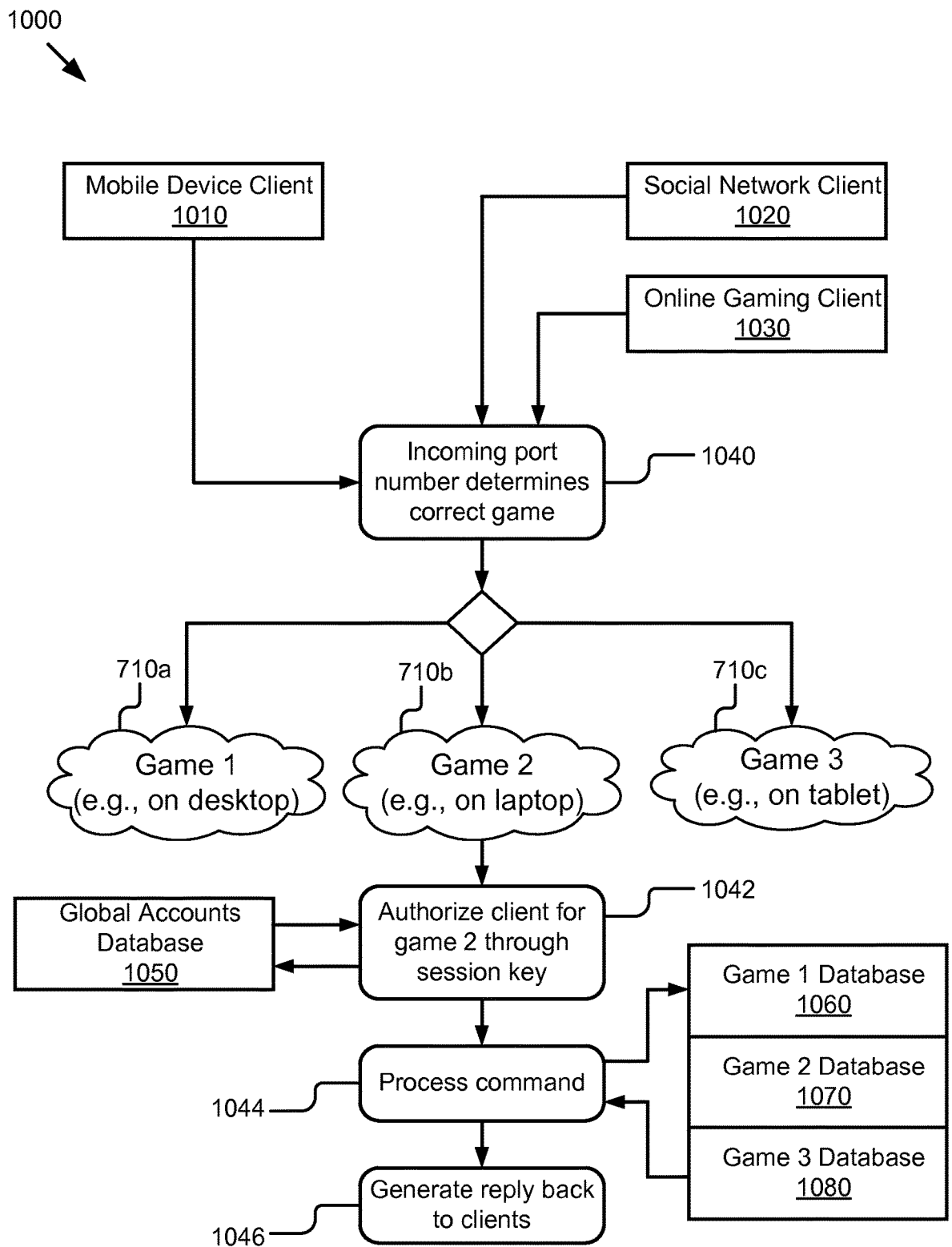
FIG. 10 is a block diagram illustrating integrated and synchronized play from various access points.

FIG. 10 illustrates integrated play of Game 1 on a desktop (710a), Game 2 on a laptop (710b), and Game 3 on a tablet (710c). As illustrated, each of these games may be accessed via a mobile device client 1010, a social network client 1020, and an online gaming client 1030. An incoming port number determines the appropriate game (1040). As one example, a client may be authorized for play in Game 2 through a session key, as illustrated by reference numeral 1042. Authorization may be with communication with a global accounts database 1050. Commands are processed (1040) with communication with databases (Game 1 database 1060, Game 2 database 1070, and Game 3 database 1080) and replies are generated back to clients (1046).

The foregoing description of the embodiments of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. As should be understood by those familiar with the art, the present technology may be embodied in other specific forms, without departing from the spirit or essential characteristics thereof. Likewise, the particular naming and division of the modules, routines, features, attributes, methodologies, and other aspects are not mandatory or significant, and the mechanisms that implement the present invention or its features may have different names, divisions and/or formats. Furthermore, as should be apparent to one of ordinary skill in the relevant art, the modules, routines, features, attributes, methodologies and other aspects of the present technology can be implemented as software, hardware, firmware, or any combination of the three. Also, wherever a component, an example of which is a module, of the present technology is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present technology is in no way limited to implementation in any specific programming language, or for any specific operating system or environment. Accordingly, the disclosure of the present technology is intended to be illustrative, but not limiting, of the scope of the present invention, which is set forth in the following claims.

What is claimed is:

1. A computer-implemented method operated using one or more computing devices for providing integrated and synchronized play of a video game hosted on one or more servers, comprising:
providing access, using the one or more computing devices via a network, to a video gaming arena by one or more players using a first user electronic device of a plurality of user electronic devices, the first user electronic device including a user interface configured to display the video gaming arena;
identifying, using the one or more computing devices, a game in the video gaming arena of interest to the one or more players based on a first incoming port number of the first user electronic device, wherein the game includes a main game for play via the first user electronic device at a first network location;
branching off a sub-game from the main game for play via a second user electronic device of the plurality of user electronic devices at a second network location, the sub-game configured to allow the one or more players to pursue a particular aspect of the main game in the sub-game, the sub-game being determined based on a second incoming port number of the second user electronic device;
reconnecting the sub-game to the main game;
transferring data from the sub-game to the main game; and
integrating play of the main game and play of the sub-game using the one or more computing devices by the one or more players within the video gaming arena by synchronizing the main game to the sub-game using the data transferred from the sub-game; updating related information on a database associated with the video gaming arena; and advancing progress of at least the particular aspect of the main game based on the sub-game.

2. A computer-implemented method according to claim 1, wherein the plurality of user electronic devices include at least one of a personal computer, a laptop, a mobile device, a gaming console, and a tablet.

3. A computer-implemented method according to claim 1, wherein the video gaming arena is hosted on a social network server.

4. A computer-implemented method according to claim 1, wherein the video gaming arena is hosted on a third party server.

5. A computer-implemented method according to claim 1, wherein the video gaming arena is hosted in a cloud.

6. A computer-implemented method according to claim 1, wherein the video gaming arena is hosted by a cross-platform server accommodating access by all of the user electronic devices.

7. A computer-implemented method according to claim 1, wherein one or more users accesses the video gaming arena via a plurality of the user electronic devices for synchronized play.

8. A computer-implemented method according to claim 1, further comprising:
designating a particular status level to the one or more players, wherein the particular status level designated controls a play capability accorded to the one or more players depending upon the particular status level.

9. A system architecture for providing integrated and synchronized play of a video game hosted on one or more servers, comprising one or more computing devices configured to operate based on instructions that cause the one or more computing devices to:
provide access via a network to a video gaming arena by one or more players using a first user electronic device of a plurality of user electronic devices, the first user electronic device including a user interface configured to display the video gaming arena;
identify a game in the video gaming arena of interest to the one or more players based on a first incoming port number of the first user electronic device, wherein the game includes a main game for play via the first user electronic device at a first network location;
branch off a sub-game from the main game for play via a second user electronic device of the plurality of user electronic devices at a second network location, the sub-game configured to allow the one or more players to pursue a particular aspect of the main game in the sub-game, the sub-game being determined based on a second incoming port number of the second user electronic device;
reconnect the sub-game to the main game;
transfer data from the sub-game to the main game;
integrate play of the main game and play of the sub-game by the one or more players within the video gaming arena by synchronizing the main game to the sub-game using the data transferred from the sub-game updating related information on a database associated with the video gaming arena; and advancing progress of at least the particular aspect of the main game based on the sub-game; and
providing the video game arena for display using the integrated play of the main game and the sub-game.

10. A system architecture according to claim 9, wherein the plurality of user electronic devices include at least one of a personal computer, a laptop, a mobile device, a gaming console, and a tablet.

11. A system architecture according to claim 9, wherein the video gaming arena is hosted on a social network server.

12. A system architecture according to claim 9, wherein the video gaming arena is hosted on a third party server.

13. A system architecture according to claim 9, wherein the video gaming arena is hosted in a cloud.

14. A system architecture according to claim 9, wherein the video gaming arena is hosted by a cross-platform server accommodating access by all of the user electronic devices.

15. A system architecture according to claim 9, wherein one or more users accesses the video gaming arena via a plurality of the user electronic devices for synchronized play.

16. A system architecture according to claim 9, further comprising:
 designating a particular status level to the one or more players, wherein the particular status level designated controls a play capability accorded to the one or more players depending upon the particular status level.

17. A computer-implemented method according to claim 1, further comprising providing the video game arena for display using the integrated play of the main game and the sub-game.

18. A computer-implemented method according to claim 17, wherein the video game arena is displayed on the user interface of the first user electronic device.

19. A computer-implemented method according to claim 17, wherein the video game arena is displayed on a user interface of the second user electronic device.

20. A system architecture according to claim 9, wherein the video game arena is displayed on the user interface of the first user electronic device.

\* \* \* \* \*

UNITED STATES PATENT AND TRADEMARK OFFICE
CERTIFICATE OF CORRECTION

PATENT NO. : 10,543,422 B1
APPLICATION NO. : 13/889274
DATED : January 28, 2020
INVENTOR(S) : Brian Joseph Wiklem and Carrie Ann Cowan Page 1 of 1

It is certified that error appears in the above-identified patent and that said Letters Patent is hereby corrected as shown below:

In the Claims

In Column 14, Line 48, please replace "the data transferred from the sub-game updating related information" with --the data transferred from the sub-game, updating related information--

Signed and Sealed this
Thirty-first Day of March, 2020

Andrei Iancu
*Director of the United States Patent and Trademark Office*